United States Patent [19]

Sullivan et al.

[11] Patent Number: 4,920,501
[45] Date of Patent: Apr. 24, 1990

[54] DIGITAL HALFTONING WITH MINIMUM VISUAL MODULATION PATTERNS

[75] Inventors: James R. Sullivan, Spencerport; Rodney L. Miller, Rochester, both of N.Y.

[73] Assignee: Eastman Kodak Company, Rochester, N.Y.

[21] Appl. No.: 259,940

[22] Filed: Oct. 19, 1988

[51] Int. Cl.$^5$ .................. H04N 1/40; G06F 15/62
[52] U.S. Cl. ...................... 364/518; 358/463; 358/458; 358/457; 382/52
[58] Field of Search ............... 358/455–460, 358/463; 382/50, 52, 56; 364/523, 519, 521, 518

[56] References Cited

U.S. PATENT DOCUMENTS

| | | | |
|---|---|---|---|
| 3,916,096 | 10/1975 | Everett et al. | 358/283 |
| 4,040,094 | 8/1977 | Everett et al. | 358/283 |
| 4,149,194 | 4/1979 | Holladay | 358/283 |
| 4,185,304 | 1/1980 | Holladay | 358/298 |
| 4,245,258 | 1/1981 | Holladay | 358/283 |
| 4,308,326 | 12/1981 | Wirth | 430/6 |
| 4,339,774 | 7/1982 | Temple | 358/283 |
| 4,468,706 | 8/1984 | Cahill | 358/300 |
| 4,517,606 | 5/1985 | Yokomiza | 358/280 |
| 4,533,941 | 8/1985 | Keane et al. | 358/75 |
| 4,554,593 | 11/1985 | Fox et al. | 358/282 |
| 4,651,287 | 3/1987 | Tsao | 364/519 |
| 4,654,721 | 3/1987 | Goertzel et al. | 358/283 |
| 4,673,971 | 6/1987 | Ikuta et al. | 358/75 |
| 4,675,743 | 6/1987 | Riseman et al. | 358/263 |
| 4,677,571 | 6/1987 | Riseman et al. | 364/519 |
| 4,698,691 | 10/1987 | Suzuki et al. | 358/283 |
| 4,706,077 | 11/1987 | Roberts et al. | 340/728 |
| 4,722,008 | 1/1988 | Ibaraki et al. | 358/283 |
| 4,730,185 | 3/1988 | Springer et al. | 340/701 |
| 4,805,033 | 2/1989 | Nishikawa | 358/298 |
| 4,821,334 | 4/1989 | Ogino et al. | 382/50 |

OTHER PUBLICATIONS

Article "Picture Generation with a Method Line Printer" by Perry & Mandelsohn, Comm. of the ACM, vol. 7, No. 5, pp. 311–313.
Text DIGITAL HALFTONING by Ulichney, MIT Press, Cambridge, MA, pp. 77–79, 127, 239–240.
Article "An Optimum Method for Two-Level Rendition of Continuous-Tone Pictures" by B. E. Bayer, Proc. IEEE Int. Conf. Comm. Conference Record, pp. (2611–2615).

Primary Examiner—Gary V. Harkcom
Assistant Examiner—Raymond J. Bayerl
Attorney, Agent, or Firm—Thomas H. Close

[57] ABSTRACT

A digital halftone image is produced by providing a binary bit image pattern having a minimum visual noise for each density level in an image. The patterns are produced by employing a stochastic combinatorial minimization technique and a human visual system modulation transfer function (MTF) weighting function to generate a halftone pattern for each density level of the multi-level digital image signal. A halftone image is produced by modularly addressing these patterns with each pixel value in the image.

18 Claims, 11 Drawing Sheets

$$\begin{array}{ccccc} \frac{-1}{16} & \frac{1}{64} & \frac{1}{8} & \frac{1}{64} & \frac{-1}{16} \\ \frac{1}{64} & \frac{1}{4} & \frac{1}{2} & \frac{1}{4} & \frac{1}{64} \\ \frac{1}{8} & \frac{1}{2} & 1 & \frac{1}{2} & \frac{1}{8} \\ \frac{1}{64} & \frac{1}{4} & \frac{1}{2} & \frac{1}{4} & \frac{1}{64} \\ \frac{-1}{16} & \frac{1}{64} & \frac{1}{8} & \frac{1}{64} & \frac{-1}{16} \end{array}$$

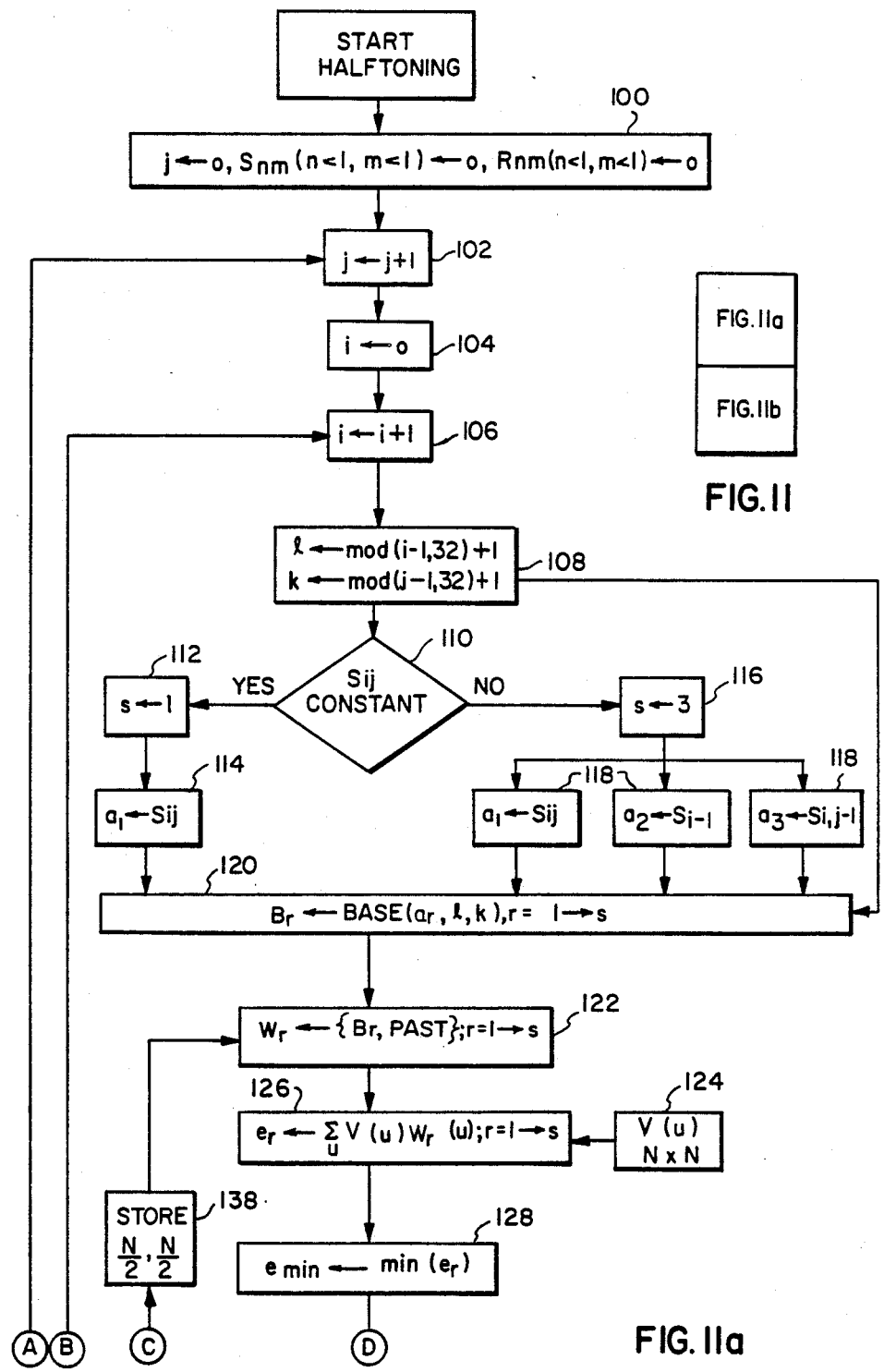

$H_1$ : BEGINNING HORIZONTAL AVERAGE
$H_2$ : ENDING HORIZONTAL AVERAGE
$V_1$ : BEGINNING VERTICAL AVERAGE
$V_2$ : ENDING VERTICAL AVERAGE

DIGITAL HALFTONING WITH MINIMUM VISUAL MODULATION PATTERNS

TECHNICAL FIELD

The present invention relates to the field of digital image processing and more particularly to a method for digital halftoning continuous-tone color images or generating of constant color image regions using a data base of minimum visual modulation bit-map patterns.

BACKGROUND ART

Digital halftoning for the purpose of generating color images with multiple levels has been practical since the mid 1960's (see, for example, "Picture Generation with a Standard Line Printer" by Perry and Mendelsohn, Comm. of the ACM, Vol. 7, No. 5, pp. 311–313). The two major techniques that are in current use are dithering and error diffusion See Digital Halftoning by Ulichney, MIT Press., Cambridge, Mass., pages 77–79, 127, 239–240. The prime dithering techniques are random dither, clustered-dot dither, and dispersed-dot dither. Random dither was developed first but it is rarely used because it produces the poorest quality image.

The other two dither techniques are used with clustered-dot being by far the most prevalent. They are both based on a threshold screen pattern that is generally a fixed size, e.g. $8 \times 8$ image pixels, which is compared with the input digital image values. If the input digital value is greater than the screen pattern number, the output is set 'on', i.e. 255 for an 8 bit input image, and if it is less, the output is set to 0. The difference between the two techniques is that the lower threshold values are centered in the clustered-dot screen pattern whereas they are scattered in the dispersed-dot screen pattern. As such the clustered-dot technique will have a central dot that increases in size as the signal level increases and the dispersed-dot technique will have small scattered dots that increase in number as the signal level increases. In both techniques the number of levels that can be represented is equal to the size in pixels of the screen pattern, e.g. an $8 \times 8$ screen can produce 64 unique levels.

Larger patterns mean more levels but also a reduction in the effective resolution because the ability to transition among levels is at a coarser pitch. At the medium pixel rate of copiers and laser printers, e.g. 300–500 dots/inch, the pattern artifacts are visible for screen patterns larger than $4 \times 4$, and since 16 levels are inadequate precision for typical continuous-tone color imagery a suboptimal resolution/level tradeoff is necessary. This resolution density level tradeoff is illustrated in FIG. 1. A second drawback of dithering is that the pattern for a given level is based on adding an 'on' to the pattern of the previous level. This highly constrains the ability to design patterns that have minimal perceived binary noise or modulation at all levels. Efforts to do this for dispersed-dot dither (see "An Optimum Method for Two-Level Rendition of Continuous-Tone Pictures" by B. E. Bayer, Proc. IEEE Int. Conf. Comm. Conference Record, pp. (26-11)-(25-15)) have been severely limited by the requirements for a single screen pattern and a small screen size. Such considerations have led to an increased interest in error diffusion for medium resolution applications.

Error diffusion is fundamentally different from dither in that there is no fixed screen pattern. Instead a recursive algorithm is used that attempts to casually correct errors made by representing the continuous input signal by binary values. The two major components are a matrix of fractions that weight past errors and a threshold operator based on the sum of those weighted errors and the current pixel that determines whether to output an 'on' or an 'off'. The best error diffusion techniques are two-dimensional, meaning that the error is fed back from previous lines as well as previous pixels. The error feedback mechanism is usually linear in that the sum error is a weighted version of past errors, but the thresholding is highly non-linear making the compound process non-linear. Approximating thresholding as signal-dependent gain, it can be shown that for positive error weights that the output binary signal will be high-pass in uniform regions thus introducing 'blue noise' into the image (see Ulichney cited above). This 'blue noise' spectrum is shown in FIG. 2. As discussed by Ulichney this 'blue noise' is a very favorable feature of error diffusion because the perception of this noise will be reduced by the low-pass filtering of the visual system causing a higher perceived signal-to-noise ratio. Unfortunately the error weights are indirectly related to this preferred noise characteristic and therefore provide suboptimal control, and for certain signal levels the causal feedback can become visually unstable generating correlated patterns or 'worms' that are highly objectionable. The most common solution is to randomly modulate the weights which reduces the 'worms' but also increases the noise. It is the object of the present invention to provide a new digital halftoning technique that improves the image quality over the aforementioned techniques for all classes of images of interest to a human observer including constant signal levels such as those generated by computer graphics.

SUMMARY OF THE INVENTION

The objects of the present invention are achieved by designing and storing large, e.g. $32 \times 32$ pixels, bit-map patterns for each density level in an image, that have minimum visual noise and modularly addressing those patterns with each pixel value in the image. In a preferred mode of practicing the invention, the bit-map patterns are produced using a combinatorial minimization algorithm called stochastic annealing and a human visual system MTF weighting function to weight the discrete Fourier Transform of each pattern to determine the perceived noise. Each pattern corresponding to an input signal level is produced independently and stored as part of a data base. In a process suitable for computer generated graphics having regions of uniform tone, for each pixel value in a digital image signal, a portion of the corresponding binary bit pattern is modularly selected to form the halftone image.

For a digital image produced by scanning a continuous tone image the process includes the following steps. For a given pixel value of the digital image signal, modularly select a future portion of an $N \times N$ neighborhood of binary values from the corresponding bit pattern. Combine the future neighborhood of selected binary values with the past portion of the $N \times N$ neighborhood of previously selected binary bits to form a combined neighborhood of binary bits. Apply a visual blur function to the combined neighborhood of binary bits to produce a perceived output value. Repeat the previous steps for a plurality of neighboring pixel values to produce a plurality of perceived values. Compute the different between the respective perceived values and the given pixel value to form difference values. Replace the given pixel value with the binary value from the bit pattern that has the minimum difference value to produce the halftone image.

As used herein, the term modularly select means to address a portion of a bit pattern with the lower significant bits of an x,y pixel address. The effect of modularly addressing the bit patterns is that of tiling the image with each of the bit patterns, and selecting the portion of each bit pattern that overlaps the pixel being processed. For a system with an input pixel spacing that is larger than the output pixel spacing by an integer factor M, the halftoning steps are equivalent except that an M×M bit-map pattern is outputted for each input pixel.

MODES OF CARRYING OUT THE INVENTION

The method of generating a halftone image according to the present invention involves designing minimum visual modulation bit-map patterns for each image signal density level, selecting the pattern corresponding to a pixel density level, and modularly addressing the pattern to select bits to be used in the halftone image. The bit-map pattern design will be described first, followed by a description of the addressing and pattern selection processes.

Figure 3:
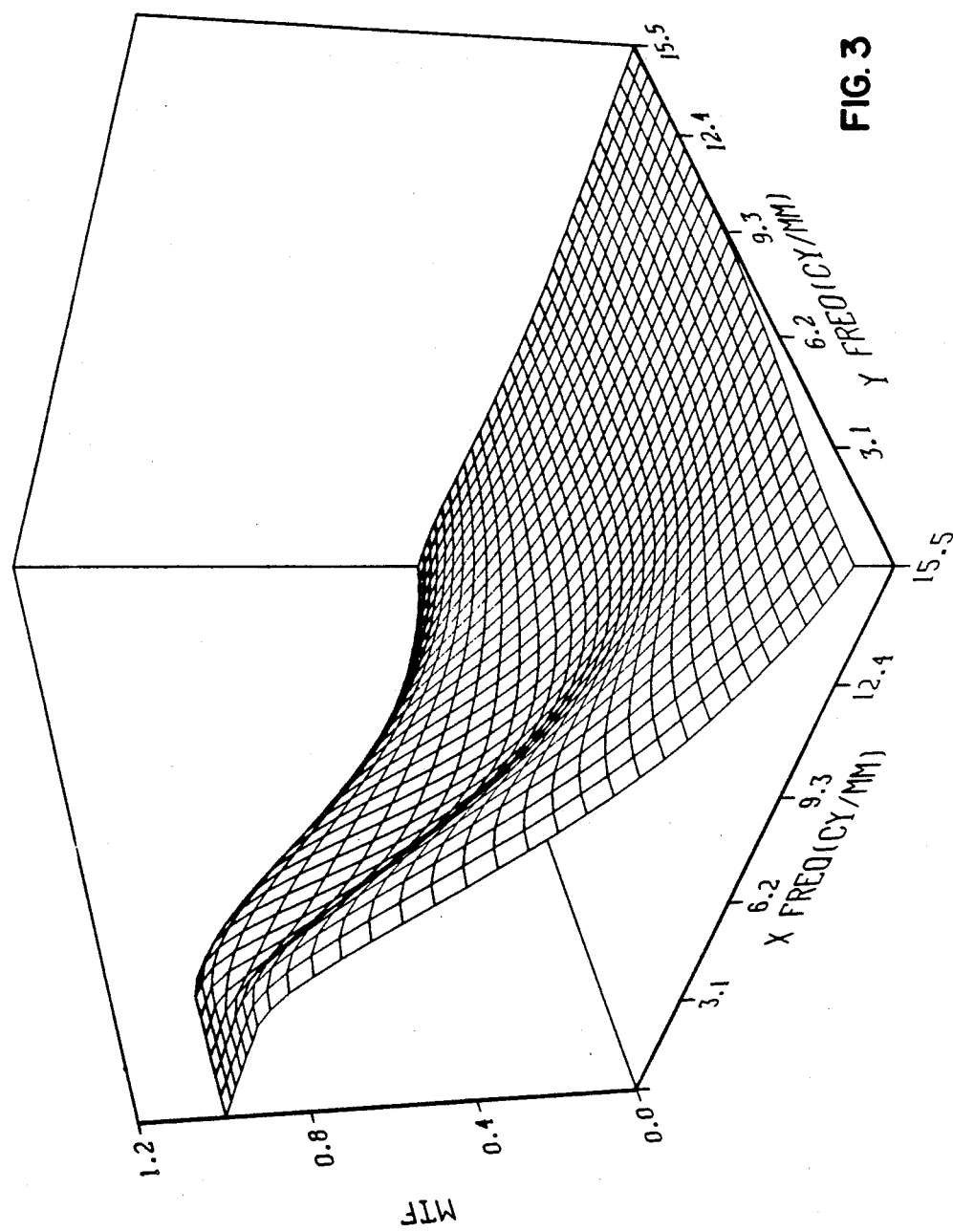
FIG. 3 is a graph showing the human visual system transfer function used to weight the discrete Fourier Transform of the bit-map pattern in the stochastic annealing process.

The goal of the bit-map pattern design is to minimize the visually perceived modulation for a pattern of zeroes and ones that on average represent a particular signal level. This requires the definition of visual modulation or cost for a given pattern and a method for minimizing the cost. For normal viewing distances, i.e. 10 inches, the effective two-dimensional modulation transfer function or MTF of the human visual system is shown in FIG. 3. It shows the low-pass filter characteristic of the vision system and the loss of sensitivity at 45 degrees corresponding to the dip in the MTF surface at that angle.

This function is given by:

$$V_{ij} = \begin{cases} a(b + c\tilde{f}_{vij})e^{-(c\tilde{f}_{vij})^d} & , \tilde{f}_{vij} > f_{max} \\ 1.0 & , \text{else} \end{cases} \quad (1)$$

where the constants a,b,c, and d can be calculated by regression fits of horizontal and vertical modulation data to be 2.2, 0.192, 0.114, and 1.1 respectively. $\tilde{f}_{vij}$ is the radial spatial frequency in cycles per degree of visual subtense, scaled for a given viewing distance, and $f_{max}$ is the frequency in cycles per degree at which the function $V_{ij}$ peaks. $\tilde{f}_{vij}$ is calculated as:

$$\tilde{f}_{vij} = f_{vij}/s_{ij}(\Theta), \quad (2)$$

where $$f_{vij}(\text{cycles/degree}) = \frac{\pi}{180 \arcsin\left(\frac{1}{\sqrt{1+dis^2}}\right)} \times$$

$$(f_i^2 + f_j^2)^{\frac{1}{2}} ; i,j = 1,2\ldots,32,$$

where dis = viewing distance in mm $$f_i = \frac{i-1}{\Delta N} = \begin{array}{l} \text{horizontal spatial frequency} \\ \text{on a document in cy/mm} \end{array}$$

$$f_j = \frac{j-1}{\Delta N} = \begin{array}{l} \text{vertical spatial frequency} \\ \text{on a document in cy/mm} \end{array}$$

$N = 32$, and $\Delta$ = dot spacing on a document e.g. 0.0625 mm; and $$s_{ij}(\Theta) = \left(\frac{1-w}{2}\right)\cos(4\Theta) + \left(\frac{1+w}{2}\right) \quad (3)$$

where $w$ = bandwidth parameter, e.g. 0.7, and $$\Theta = \arctan\left(\frac{f_j}{f_i}\right).$$

Figure 1:
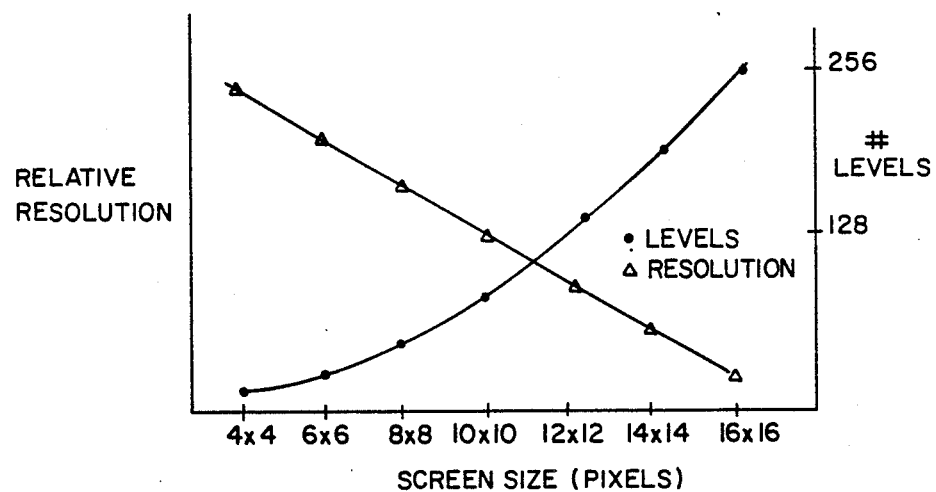
FIG. 1 is a graph illustrating the resolution versus number of levels tradeoff of conventional fixed screen dither.
Figure 2:
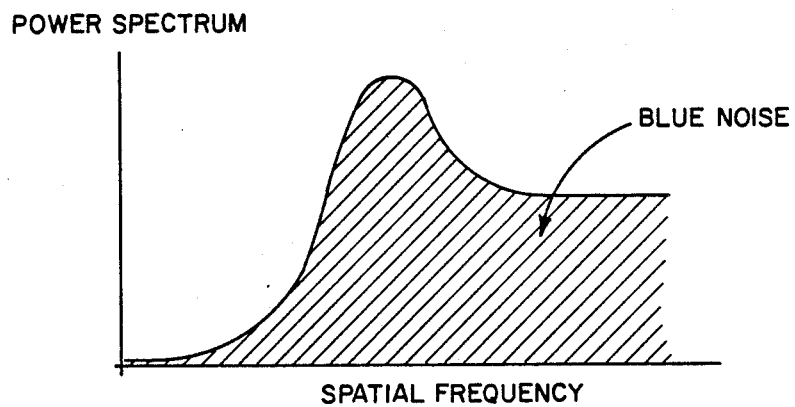
FIG. 2 is a graph showing the "blue noise" spectrum of the high frequency noise that results from conventional error diffusion.

To evaluate the cost for a particular 32×32 pattern, the modulus of the discrete Fourier Transform (DFT)

of the pattern is calculated and multiplied by the visual MTF and summed. That is $$\cos t = \sum_{i=1}^{32} \sum_{j=1}^{32} V_{ij} \sqrt{P_{ij} P^*_{ij}}, \quad (4)$$

where i,j are x,y spatial frequency indices with i,j=32 representing the output binary pixel rate, $V_{ij}$ is the visual MTF scaled to the output pixel rate, $P_{ij}$ is the pattern DFT, and * represents complex conjugation. The Fourier domain was chosen for the minimization because the DFT assumes that the input is periodically replicated in a tile fashion over all space which is consistent with the modular addressing of the pattern to be described later. A 32×32 region was chosen to allow for enough degrees of freedom in the Fourier domain to shape the noise into a 'blue noise' spectrum as in FIG. 2 without the excessive complexity of larger areas, and because it easily accommodates the 256 levels on an 8 bit input signal with each level corresponding to four 'on' dots.

The number of ways to turn p dots 'on' out of 1024 is given by $$\binom{1024}{P} = \frac{1024!}{p!(1024 - p)!}, \quad (5)$$

which for all but a few high and low values of n is so large that a brute force search for the minimum cost pattern is not feasible. Resort was therefore made to a probabilistic minimization technique called stochastic annealing or stochastic relaxation (see for example, "Stochastic Relaxation, Gibbs Distributions, and Bayesian Restoration of Images" by S. Geman and D. Geman, IEEE Trans. on PAMI, Vol PAMI-6, No. 6, Nov. 1984, pp. 721–741). The key feature of this iterative technique as compared to more aggressive minimization techniques such as steepest descent (see any text on numerical analysis) is that it can escape from a local minimum by accepting cost increases at each iteration with a decreasing but greater than zero probability. The process includes the following steps:

1. Initialize a given density level pattern with random positions for 'on' dots, where p is a number that is proportional to the given density;
2. Calculate the cost using equation (4);
3. Randomly switch a pair of the on/off dots and calculate a new cost using equation (4);
4. Calculate a test statistic q for determining if the new pattern is from a lower cost random process given by;

$$q = \exp\left(\frac{\Delta \cos t}{T}\right),$$

where $\Delta \cos t$=new cost-previous cost, and T is a normalization parameter set initially such that a large percentage, e.g. 80%, of new patterns will be judged to be from a lower cost random process even if the $\Delta \cos t$ is greater than 0;

5. If q>1, i.e. $\Delta \cos t$<0, accept the new pattern. If q≦1, accept the new pattern if $\epsilon \leq q$, where $\epsilon$ is a uniform random number between 0 and 1, and reject the new pattern and revert to the previous pattern if $\epsilon > q$;
6. After many loops of steps 3–5, e.g. 1500, decrease T to kT where k<1, e.g. 0.95, and go to step 3 so that positive $\Delta \cos t$ values are accepted with a geometrically decreasing likelihood as the search proceeds;
7. Stop when the cost at successive decreases in T are no longer changing or when a fixed number of decreases have occurred, e.g. 300.

A computer program, written in the fortran program language, for performing the above steps is included in Appendix A. This program was executed on a CRAYII TM super computer to produce a set of 256 minimum visual noise binary bit patterns, corresponding to 256 density levels.

Figure 4A:
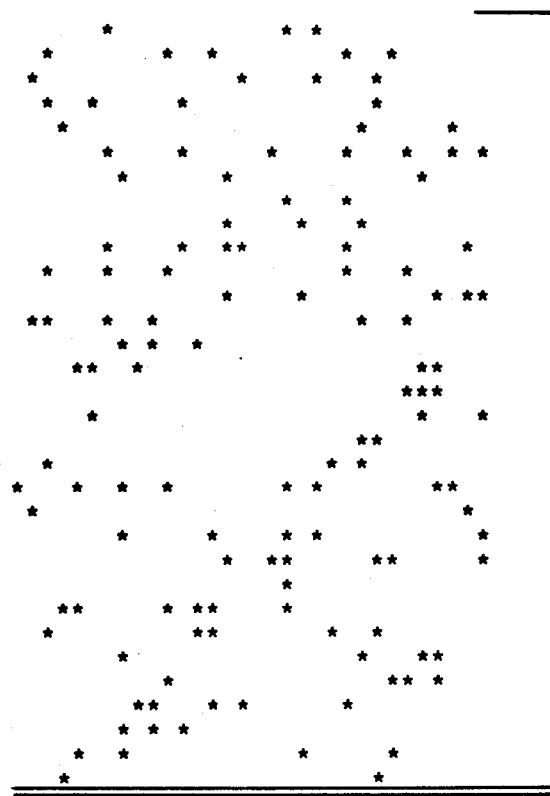
FIG. 4a is an example of an initial random bit-map pattern for a mean level of ⅛th or 128 'on' dots.
Figure 4B:
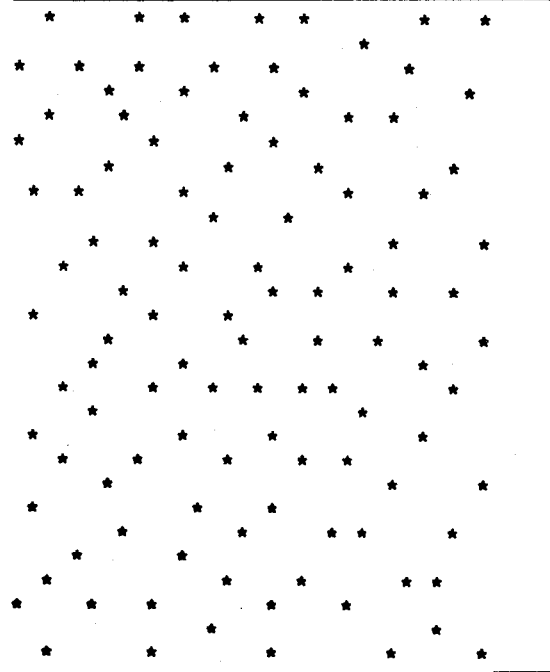
FIG. 4b is an example of a final minimum cost bit-map pattern for a mean level of ⅛th or 128 'on' dots.
Figure 5:
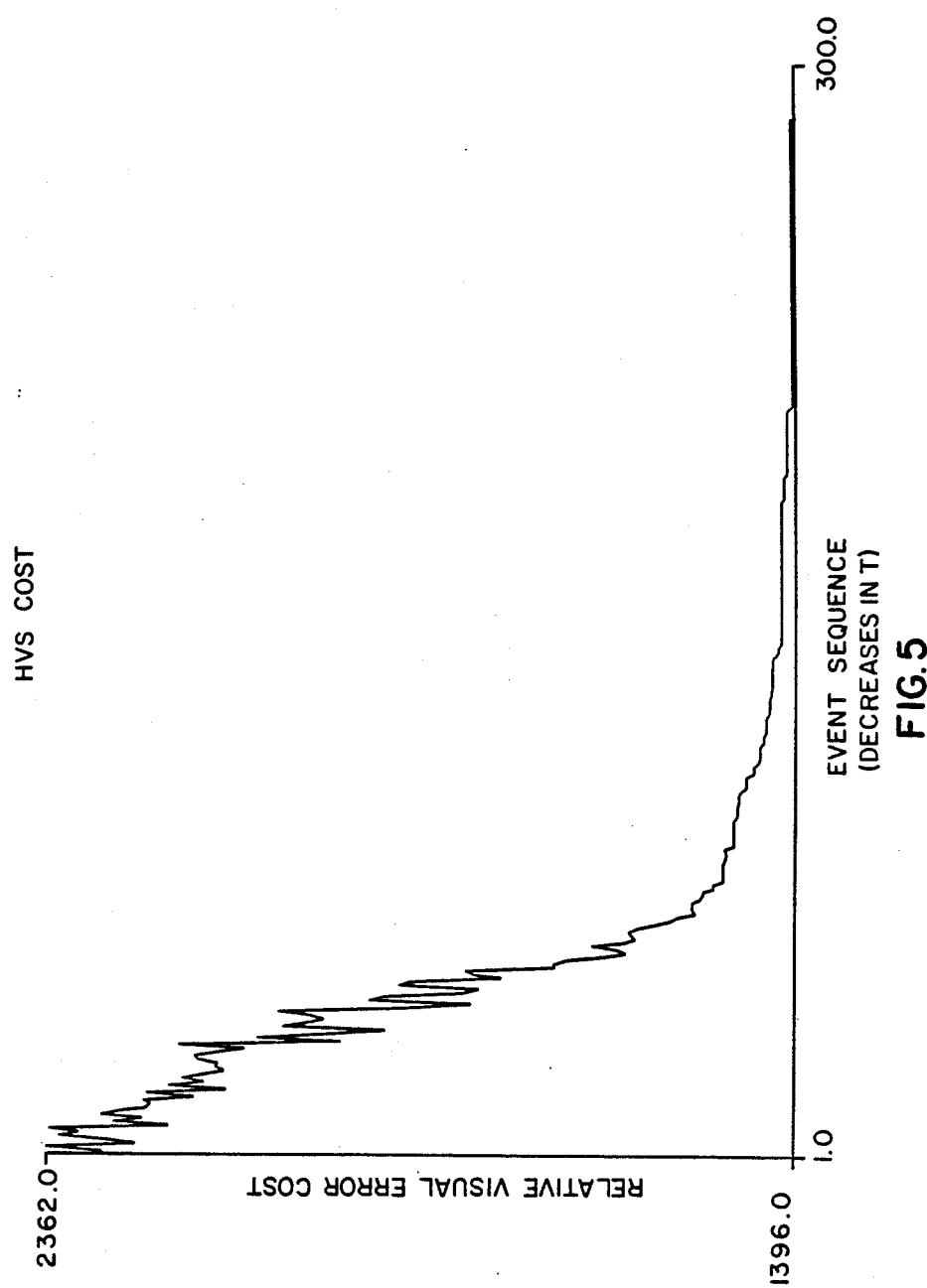
FIG. 5 is a graph showing the relative visual error cost at each T value for the annealing process that generates the pattern in 6b.

FIGS. 4a and 4b show the 'on' pixel positions of the initial random pattern and the final minimum cost pattern for a mean value of ⅛th or 128 'on' dots that resulted from a single run of this process. As the figures show, the final pattern appears random but in fact is more spatially regularized without large gaps or clumps which lead to undesirable low frequency modulation. FIG. 5 shows the progression of cost estimates at each decrease in T with each temporary dip in the curve being a local minimum from which the minimization process escaped. In addition, empirical results indicate that multiple runs produce slightly different final patterns due to the inherent randomness of the search process and that better results can be achieved by selecting the pattern with the lowest final cost from a small number of independent searches, e.g. 10.

Figure 6:
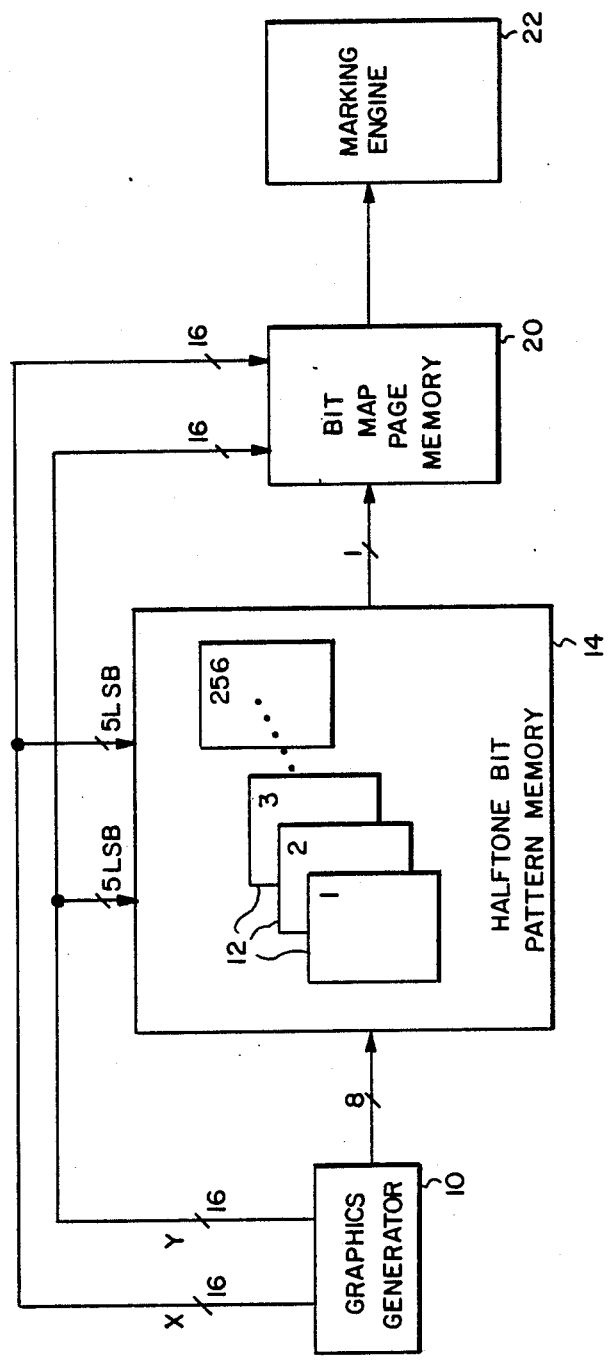
FIG. 6 is a block diagram showing the halftone image processing technique according to the present invention for constant tone graphics.
Figure 7:
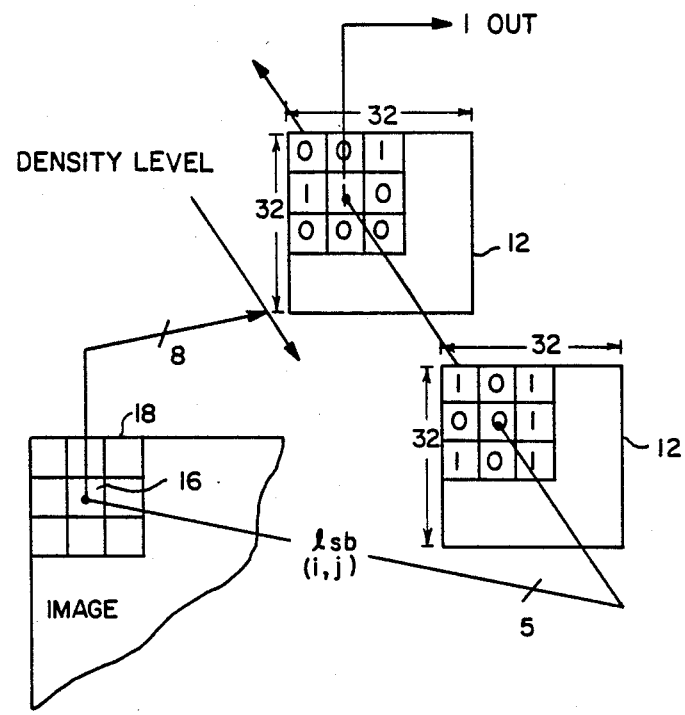
FIG. 7 is a diagram showing the addressing of the data base as the input image is processed.

Referring now to FIG. 6, the method of generating a halftone image according to one mode of the present invention is illustrated schematically. A digital monochrome image composed of regions of constant tone is generated by an input device 10 such as a personal computer programmed to generate graphics. The digital image is supplied as 8 bit pixel values representing one of 256 density levels. The x,y location of each pixel on a page is identified by two 16-bit words. Two hundred fifty-six 32×32 bit halftone dot patterns (12) generated on a super computer as described above are stored in a bit pattern memory 14. As illustrated schematically in FIG. 7, the 8 bit density level for a pixel 16 from the image 18 is employed to select the corresponding halftone dot pattern. The 5 least significant bits of the x and y pixel addresses are employed to modularly address the selected 32×32 bit halftone dot pattern and produce a halftone bit pattern (e.g. 1 bit if the resolution of the input image and the output image are the same) as an output. Referring to FIG. 6, the halftone bit pattern is supplied to a bit map page memory 20. The full 16 bit x,y pixel address is employed to address the page memory, and the halftone bit pattern is stored in the page memory 20 at the indicated pixel location.

When the page memory is full, the contents are supplied to a medium resolution (e.g. 300–500 dots/inch) binary marking engine 22, such as a laser or ink jet printer. Alternatively, if the input is synchronized with the marking engine, the output of the bit pattern memory may be supplied directly to the marking engine without the need for a bit map page memory 20.

The halftone dot pattern generation steps of the halftone image generation process described with reference to FIG. 6 is implemented simply by a programmable read only memory in which the halftone bit patterns are stored.

If the resolution of the marking engine 18 is higher than the resolution of the image supplied by the input device 10, multi-bit portions of the halftone bit maps are supplied to the marking engine for each input pixel.

The images produced by the above described technique for computer generated monochrome images at 400 dots per/inch composed of regions of constant tone show a significant improvement in perceived noise compared to dither and error diffusion techniques.

When the above described method is applied to continuous tone digital images, such as those produced by scanning and digitizing a photograph, there is a perceived increase in noise due to the frequent switching between the halftone bit patterns in areas of gradually changing contrast. The noise was reduced for continuous tone images by a technique of monitoring the visibility of the noise introduced in the halftone image due to switching from one bit pattern to another for adjacent pixels. If the noise introduced by switching between halftone patterns is more than that which would be introduced by selecting a pattern corresponding to the density of the pixel, the pattern for the adjacent pixel is chosen. This improved technique for generating a halftone image from a continuous tone digital image will now be described with reference to FIG. 8.

Figures 9, 10:
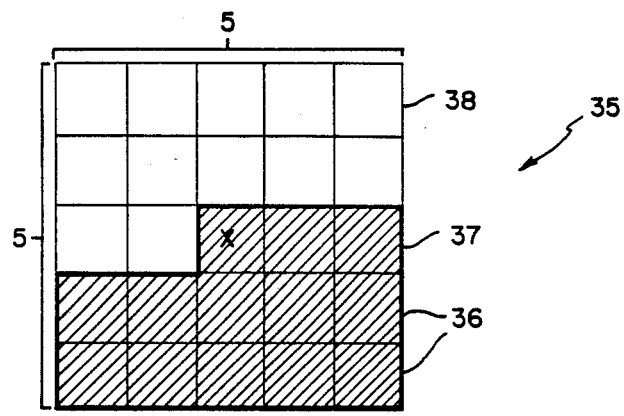
FIG. 9 is a sketch illustrating the combination of past binary values and future bit-map patterns to determine the pattern from which the current binary value is to be selected.
FIG. 10 shows an unnormalized 5×5 human visual system blur matrix used for weighting the bit-maps to select the data base that provides minimum local visual error.

A continuous tone image 30 such as a photographic image is scanned by scanning apparatus 32, such as a video or graphic arts scanner. The scanner samples the image density at each sampling location (pixel) and digitizes the density value to 8 bits, or 256 levels. The x,y position of each pixel is supplied from the scanner as two 16-bit words. The 8 bit density for each pixel is employed to select a particular bit pattern in a halftone bit pattern memory 34 having 256 bit patterns generated as described previously. The 5 least significant bits of the x and y pixel addresses are employed to modularly address a portion of the selected halftone bit pattern. The portion of the bit pattern addressed is the binary value indicated by the address, the next two binary values in the row, and 5 binary values in each of two successive rows. These thirteen binary values represent the "future portion" in a 5×5 block of binary values centered on the location indicated by the address. FIG. 9 illustrates a 5×5 block (35) of pixels 36, where the current address location is indicated by an X, and the "future portion" 37 is indicated by cross hatching. In addition to the thirteen binary values from the selected pattern corresponding to the present density pixel value, 13 binary values are also selected from the patterns corresponding to the density of the previous pixel in the current line of pixels and the density of the pixel in the line immediately above the current pixel. The modular address employed for selecting these values is the same as the current pixel, but the density values are provided by a 1 line delay 40, and a one pixel delay 42. Each of these three patterns of 13 binary values is combined with 12 binary values representing a "past portion" 38 of the 5×5 block of binary values (see FIG. 9) to generate 5×5 blocks of binary values 44. The 12 binary values representing the "past portion" of the 5×5 blocks are supplied from a bit map page memory 46 (described below). Each of the 5×5 blocks of binary values is processed (48) by applying the 5×5 human visual system (HVS) blur filter. The coefficients of the HVS blur filter are shown in FIG. 10, and correspond to the values of the HVS function plotted in FIG. 3. To process the 5×5 blocks, the coefficients of the blur filter are multiplied by the corresponding binary values in the 5×5 blocks, and the results for each block are summed and normalized to the maximum density value. The absolute value of the nomalized sum of the blurred values from each of the three blocks is subtracted from the actual density value of the present pixel to determine the blur error. The minimum blur error is detected, and the binary bit from the pattern producing the minimum blur error is selected 50. This selected bit is the bit that produces the least visual error in the halftone pattern when the density level changes from one pixel to its nearest neighbor directly above or to the left. The selected bit is stored in the bit map page memory 46 at the location indicated by the current x,y address. When the page memory 46 is filled, the halftone dot pattern is sent to the marking engine 52.

Figure 8:
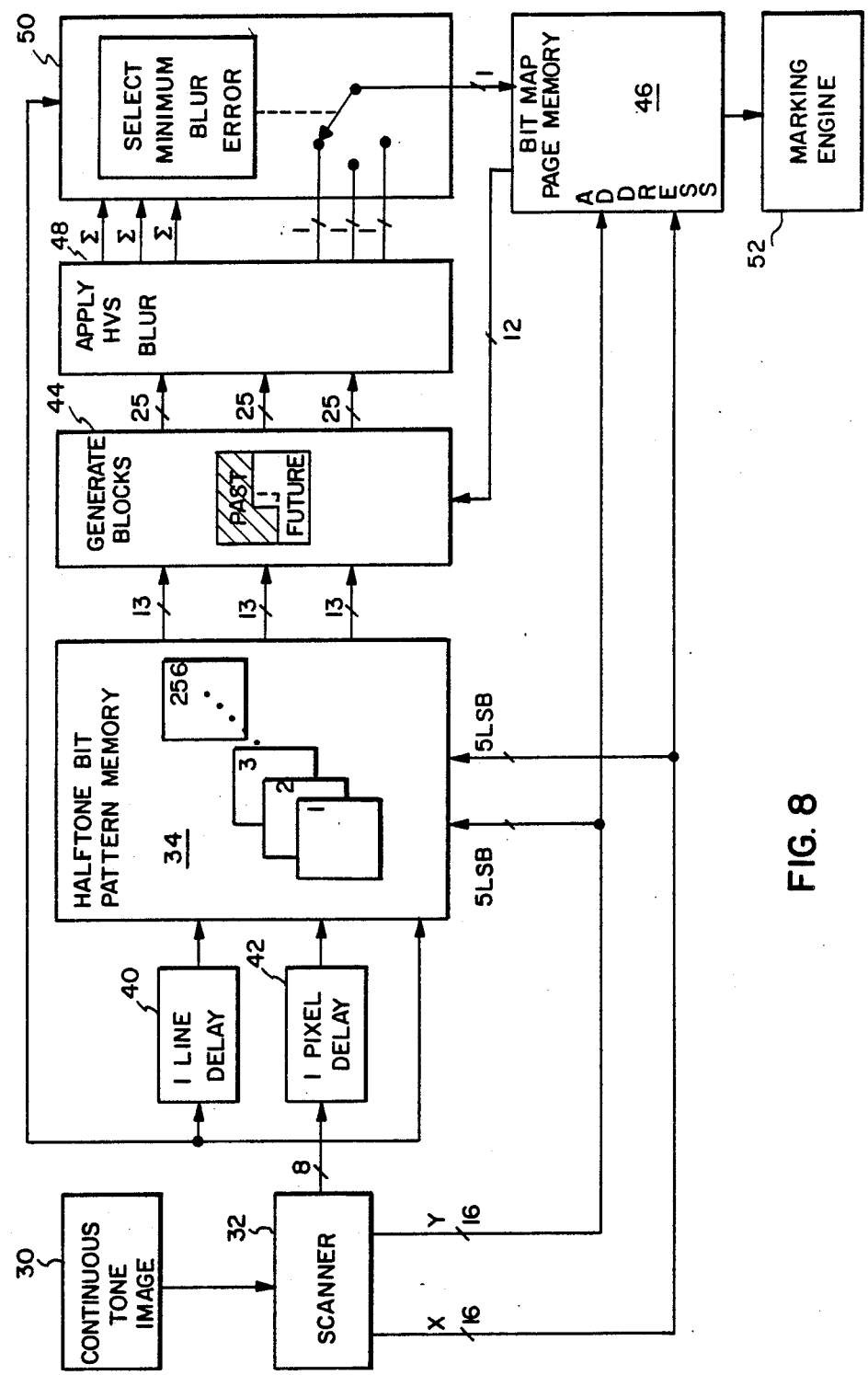
FIG. 8 is a block diagram showing the halftone image processing technique for continuous tone images.
Figure 11B:
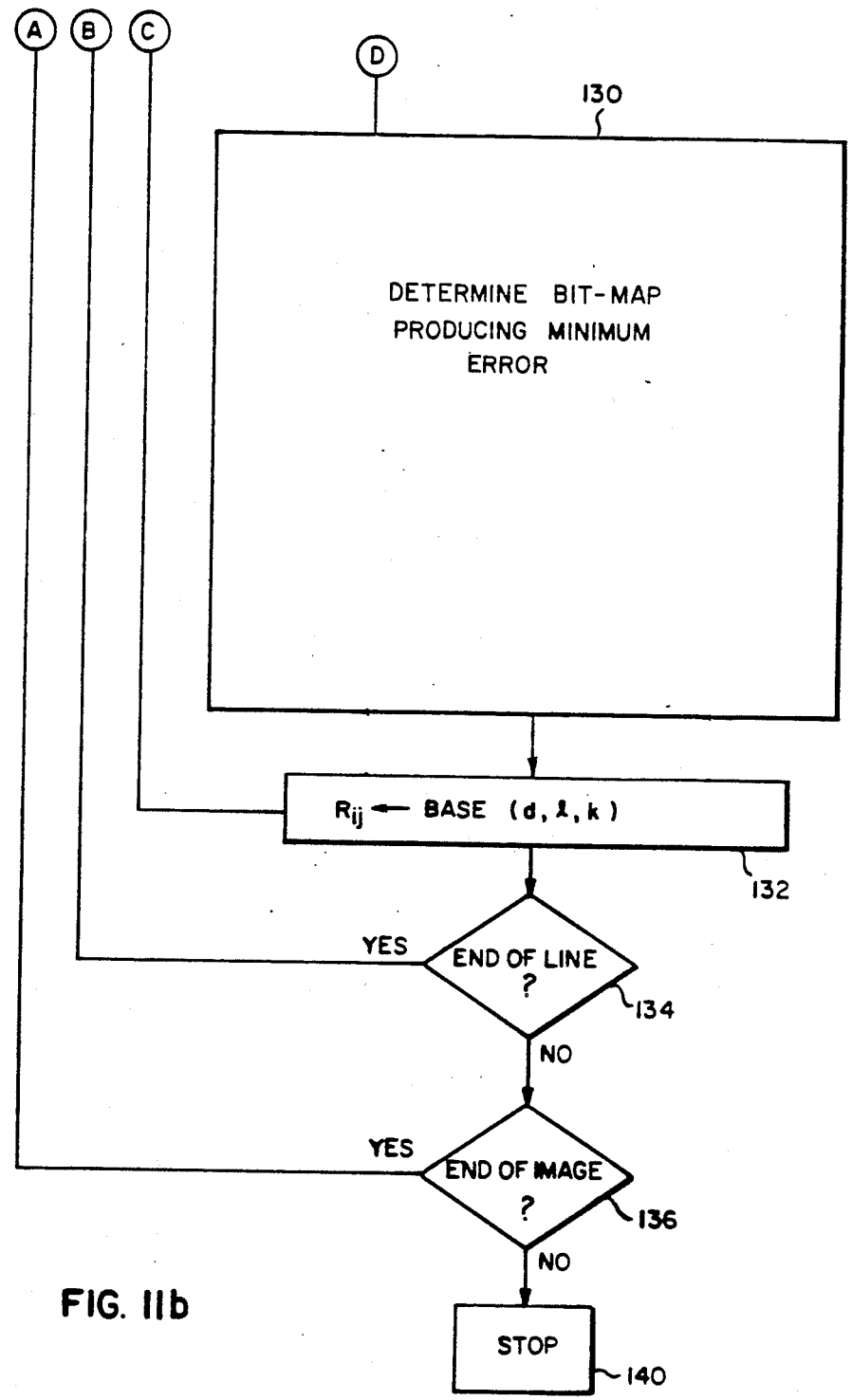
FIG. 11 is a flow chart illustrating the logic flow for the halftoning technique according to the present invention.

The halftone image generation process described in FIG. 8 is implemented by a programmed digital computer such as a microprocessor having a read only memory (ROM) for storing the halftone bit patterns or alternatively by a custom designed digital signal processing circuit for increased speed. The steps for programming a microprocessor to generate a halftone image from either a constant tone image (as described with reference to FIG. 6) or a continuous tone image (as described with reference to FIG. 8) will now be described with reference to FIG. 11.

The following description assumes that the digital input image signal is presented to the halftoning apparatus in a linear raster scan. At the start of scan, the internal counter j for the line number and i for the pixel number are initialized as well as the non-image (border), i.e., (n<1, m<1), input and output boundaries $S_{nm}$ and $R_{nm}$ (100, 104). The counters i and j are incremented by 1 (102, 106). The 5 least significant bits 1,k of i,j are isolated by a modulo-32 operation (108) and passed as a position pointer into the data base. A check is made for a constant tone image (110). If yes, the number of data base accesses s is set of 1 (112) and the current pixel value is used to address the appropriate bit-map in the data base (114). If no, the number of data base accesses s is set to 3 (116) and the current pixel as well as its two nearest neighbors are used to address the appropriate bit-maps in the data base (118). For each data base access the binary values in the bit-maps from $1-N/2 \rightarrow 1+N/2$ and $k \rightarrow k+N/2$ excluding $1-N/2 \rightarrow 1-1$ for line k are extracted from the data base (120). The past outputted binary values for $i-N/2 \rightarrow i+N/2$ and $j \rightarrow j-N/2$ excluding $i \rightarrow i+N/2$ for line i are merged with the extracted binary values for each data base access (122). The N×N visual blur coefficients V(u) (124) are used to weight the merged binary fields to calculate the error for each data base access (126). The minimum error $e_{min}$ is calculated (128) and compared with the error for each data base access to determine which bit-map produced the minimum error (130). The binary value at 1,k from that bit-map is outputted at pixel i,j (132). A check is made for the end of line (134) and end of image (136). If not the end, the appropriate counters are reset or incremented and the outputted value is stored (138), else the output image is complete and the halftoning stops (140).

Figure 12:
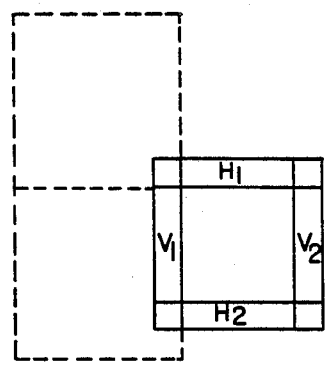
FIG. 12 is a sketch of the block overlap and average pixel and line regions used in calculating horizontal and vertical slopes for shifting 'on' dots to account for mean shifts in input image blocks.
Figure 13:
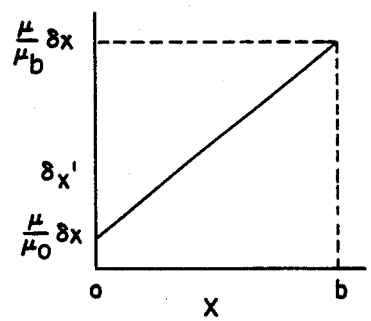
FIG. 13 is a graph showing the one-dimensional linear mapping of dot spacings to shift local output means across image blocks.
Figure 14:
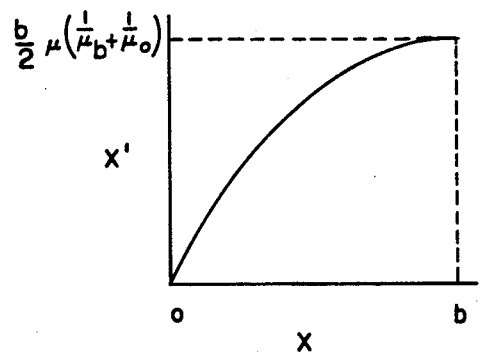
FIG. 14 is a graph showing the one-dimensional quadratic mapping of dot positions to shift local output means across image blocks.

An assumption in the halftoning technique just described for continuous tone scanned image data is that data base switching due to input signal variations do not significantly affect the preferred high frequency character of the bit-maps. Simulated images show that this is only partially true. Input scan noise and small pixel-to-pixel variations in low contrast image areas can cause low frequency gaps or dot-clumps at switching boundaries that were purposely suppressed in each bit-map. An alternative solution is to configure the switching mechanism to take into account local variations in the input slope. This can be accomplished on a block-by-block basis by estimating the horizontal and vertical slopes of an input block with the difference between the average pixel values and average line values at the beginning and end of the block. To avoid the appearance of visible block artifacts due to integer precision it is necessary to overlap successive blocks by one line and one column in this calculation. This block overlap is shown schematically in FIG. 12. The average value of the block is then used as the data base address and the slope of the pixel value in the blocks are used to shift the 'on' dots in the data base so that the average distance between dots across the block correspond to the calculated slopes. This is accomplished by a quadratic mapping of integer coordinates that linearly adjust the dot placements. This is illustrated for one dimension in FIGS. 13 and 14 with the appropriate equations given by $$\delta x' = \left[\frac{\mu}{b}\left(\frac{1}{\mu_b} - \frac{1}{\mu_0}\right)x + \frac{\mu}{\mu_0}\right]\delta x, \quad (6)$$

and its integral $$x' = \frac{\mu}{b}\left(\frac{1}{\mu_b} - \frac{1}{\mu_0}\right)x^2/2 + \frac{\mu}{\mu_0} x, \quad (7)$$

where $\mu_o$ and $\mu_b$ are the average values at the beginning and end of a block of length b, $\mu$ is the average of the entire block, and the input positions x are the centers of each integer bin in the block starting from 0.5. The expected value of $\delta x'$ is $1/\mu$ so that the expected value of $\delta x'$ at X=O and X=b are $1/\mu_o$ and $1/\mu_b$ respectively. Since the spatial precision in each direction is one sample on input and output, it is necessary to approximate the above equations by selecting an integer number of dots d to move an integer number of samples. For a shift of one sample spacing this is $$x(D - d) + (x + 1)d = x'D, \quad (8)$$

or $$d = Rnd(x' - x)D, \quad (9)$$

where D is the number of 'on' dots in each column or line in the block, and Rnd means round to the nearest integer. For example, if the block is 16×16 and x' and D for the first column are 0.75 and 7 then $d = Rnd((0.75-0.5)7) = Rnd(1.75) = 2$ meaning that two dots must be moved to the next column to appropriately decrease the mean value at the beginning of the block. The two dots to be moved can be selected randomly or by a rule such as move the dots with the most unfilled space in the direction of movement making sure that one pixel is never occupied by more than one dot. There will also be an error after each move given by $E = x' - x - d/D$ which in the above example is $-0.0357$ meaning that more than the exact fractional number of dots were moved to the next column. This error can be ignored or propagated to the next column by adding it to the next x'. Since the column and line means are independent the columns can be shifted first followed by the lines. An additional improvement is to have a variable block size. This can be advantageous in regions that have a non-linear transition across a block such as a sharp edge. If the average block value given by $\mu$ is greater than a small central average by more than a threshold the block can be decomposed into four blocks of one-fourth the size with each sub-block processed independently.

The halftoning technique may be applied to a color image having a plurality of color components, by performing the halftoning process independently on each component.

Industrial Applicability and Advantages

The halftoning technique of the present invention is useful in systems that generate binary outputs from continuous tone input images or computer generated graphics. The invention has the advantage that it is optimal in terms of perceived noise in constant signal regions and does not have the periodic patterns of dithering or correlated directional noise of error diffusion. The method has implementation advantages over error diffusion because it does not require real multiplications. This is because the choice of data base address is based on a binary convolution which is merely an addition of the coefficients corresponding to 'on' pixels, whereas error diffusion involves weighting the differences between input and output values which are not binary. In addition, the halftoning technique of the present invention requires less storage than error diffusion because only the single bit output image is stored as multiple lines, whereas in high-quality error diffusion (see, for example, the Stucki matrix in Digital Halftoning by Ulichney, MIT Press Cambridge, Mass.) multiple lines of the full-precision input image must be stored.

Appendix A

```
      PROGRAM anneal
c
c This program searches for a minimum pattern of k 'on' values in
c a 32x32 block by the technique of stochastic annealing using the
c human visual weighted modulation as an objective function.
c
c         pat(i,j)   = the pattern at any stage in the search
c        best(i,j)   = a random pattern on input and the minimum
c                      visual modulation pattern on output
c      hvsmtf(i,j)   = the human visual system MTF
c        vector(i)   = a one-dimensional raster version of pat(i,j)
c         point(i)   = points to the positions in vector of the 'on' dots
c          cost(i)   = the cost at iteration i
c       array(i,j)   = complex version of pat(i,j) with a zero imaginary
c        coef(i,j)   = the discrete fourier pattern coefficients
c            rnset   = a subroutine that sets a random seed
```

```
c          rnper = a subroutine that a randomly reorders a vector
c          rnunf = a subroutine that generates a uniform random number
c
       real pat(32,32),img(32,32),hvsmtf(32,32),vect(1024),newcst
       real best(32,32),cost(1000)
       integer point(1024),trys,count
       complex array(32,32),coef(32,32)
       external rnset,rnunf,rnper
       data img/1024*0.0/,vect/1024*0.0/
       equivalence (vect(1),pat(1,1))
       write(6,1000)
 1000  format(' enter # of "ons", # of iter/temp, and # temps(<1000)')
       read(5,*) numon,trys,ntemp
       numoff=1024-numon
       write(6,1001)
 1001  format(' enter: pit(mm),view(mm),asym(sym=1.),shape(0-lp,1-bp)')
       read(5,*) spac,vdis,bw,iclip
       call hvs(32,vdis,spac,bw,iclip,hvsmtf)
       write(6,1002)
 1002  format(' enter initial temperature, and rate reduction')
       read(5,*) t0,rate
c
c generate random start pattern and find initial cost
c
       t=t0
       count=0
       moves=1
       call rnper(1024,point)
       do 10 i=1,numon
       vect(point(i))=1.0
   10  continue
       do 30 j=1,32
       do 20 i=1,32
       best(i,j)=vect((j-1)*32+i)
       array(i,j)=cmplx(best(i,j),img(i,j))
   20  continue
   30  continue
       write(15,1003) ((best(i,j),j=1,32),i=32,1,-1)
       call fft2d(32,32,array,32,coef,32)
       oldcst=0.0
       do 50 j=1,32
       do 40 i=1,32
       oldcst=oldcst+hvsmtf(i,j)*cabs(coef(i,j))
   40  continue
c
c randomly select element to turn off and a second element to turn on
c and update pointer array to on and off elements
c
   55  index1=jint(rnunf()*numon+1)
       vect(point(index1))=0.0
       index2=jint(rnunf()*numoff+1)
       vect(point(numon+index2))=1.0
       itemp=point(index1)
       point(index1)=point(numon+index2)
       point(numon+index2)=itemp
c
c calculate new cost
c
       count=count+1
       do 70 j=1,32
       do 60 i=1,32
       array(i,j)=cmplx(pat(i,j),img(i,j))
   60  continue
   70  continue
       call fft2d(32,32,array,32,coef,32)
       newcst=0.0
       do 90 j=1,32
       do 80 i=1,32
```

```
      newcst=newcst+hvsmtf(i,j)*cabs(coef(i,j))
   80 continue
   90 continue
c
c estimate gibbs distribution and compare with uniform random number
c If new move accepted update cost and keep modified vector.
c If not do not update cost and change vector back to unmodified version.
c
      delc=newcst-oldcst
      r=-t*alog(rnunf())
      if(delc.le.r) then
         oldcst=newcst
      else
         vect(point(index1))=0.0
         vect(point(numon+index2))=1.0
         itemp=point(index1)
         point(index1)=point(numon+index2)
         point(numon+index2)=itemp
      endif
c
c determine whether to change temperature
c
      if(count.lt.trys) go to 55
c
c change temperature and restart from last iteration of previous
c temperature if the maximum number of temperatures have not been reached
c
      t=t*rate
      count=0
      cost(moves)=oldcst
      moves=moves+1
      if(moves.le.ntemp) go to 55
      do 110 j=1,32
      do 100 i=1,32
      best(i,j)=vect((j-1)*32+i)
  100 continue
  110 continue
      write(*,1003) ((best(i,j),j=1,32),i=32,1,-1)
 1003 format(32f2.0)
      write(*,1004) (cost(i),i=1,moves)
 1004 format(5e12.4)
      write(*,1005) t
 1005 format('next temperature',e14.4)
      end
c
c
      subroutine hvs(n,vdis,spac,bw,iclip,hvsmtf)
      real hvsmtf(n,n),vfx(256),vfy(256)
      data pi/3.141593/,a/2.2/,b/0.192/,c/0.114/,d/1.1/
      scale=pi/(asin(1./sqrt(1.+vdis**2))*180.)
      m=n/2+1
      delf=1./(2.*(m-1)*spac)
      do 10 i=1,m
      vfx(i)=(i-1)*delf*scale
      vfy(i)=(i-1)*delf*scale
   10 continue
      do 30 i=m,1,-1
      do 20 j=m,1,-1
      freq=sqrt(vfx(i)**2+vfy(j)**2)
      angle=pi/2
      if(vfx(i).ne.0.0) angle=atan(vfy(j)/vfx(i))
      angfac=cos(4*angle)*(1.-bw)/2.+(1.+bw)/2.
      hvsmtf(i,j)=a*(b+c*freq/angfac)*exp(-(c*freq/angfac)**d)
      if(iclip.eq.0.and.j.lt.n) then
         if(hvsmtf(i,j).lt.hvsmtf(i,j+1)) then
            hvsmtf(i,j)=hvslast
         else
```

```
      hvslast=hvsmtf(i,j)
    endif
  endif
20 continue
30 continue
   call fold(n,hvsmtf)
   return
   end
c
c
   subroutine fold(n,array)
   real array(n,n)
c
c fold about n/2+1 along y
c
   do 20 j=1,n/2+1
   do 10 i=2,n/2
   ifold=n+2-i
   array(ifold,j)=array(i,j)
10 continue
20 continue
c
c fold about n/2+1 along x
c
   do 40 i=1,n
   do 30 j=2,n/2
   jfold=n+2-j
   array(i,jfold)=array(i,j)
30 continue
40 continue
   return
   end
```

Appendix B

```
0001         Subroutine Halftone(InBuf,OutBuf,PrvLn)
0002
0003         Implicit None
0004
0005         include 'olyp:pattern.inc'
0026
0027         Integer*4    CtrLn,          !Center line of image to put in Buf8
0028      x               PNum,           !Current pixel number
0029      x               DR,DC,          !Row and column index for patterns
0030      x               I,J             !Loop Variable
0031
0032         Integer*2 InBuf(Npixs,5),    !Input buffer
0033      x             OutBuf(Npixs,3),  !Multi-line output buffer
0034      x             PrvLn(0:Npixs),   !Previous pixel values
0035      x             Get_Mono_Lvl      !Determines best choice for pixel
0036
0037       C Initialize the output buffer
0038              Do I = 1,Npixs
0039                     Do J = 1,3
0040                            Outbuf(I,J) = 0
0041                     Enddo
0042              Enddo
0043
0044       C Mask the input buffer
0045              Do I = 1,Npixs
0046                     Do J = 2,5
0047                            Inbuf(I,J) = IIAND(Inbuf(I,J),'FF'X)
0048                     Enddo
0049              Enddo
0050
0051       C Start the processing
0052              Do CtrLn = 1,Nlins
0053                     DR = Mod(Ctrln,32) + 1
0054
0055       C      Get 1 line of image data centered at Ctrln
0056                     Call Get_Image_Lns(CtrLn,InBuf)
0057
```

```
0058    C       Process a single-line of data
0059                    Do PNum = 1,Npixs
0060
0061                            DC = Mod(Pnum,32) + 1
0062
0063                            PrvLn(Pnum) = Get_Mono_Lvl(CtrLn,Pnum,Inbuf,Outbuf,PrvLn)
0064
0065                            OutBuf(Pnum,1) = Pattern(DR,DC,PrvLn(PNum)+1) * 255
0066
0067                    Enddo
0068
0069    C       Write out a line
0070                    Call Put_Mono_Lns(CtrLn,OutBuf)
0071
0072    C       Propogate succeeding lines in outbuf and inbuf
0073                    Do I = 1,Npixs
0074                            InBuf(I,5) = InBuf(I,4)
0075                            InBuf(I,4) = InBuf(I,3)
0076                            InBuf(I,3) = InBuf(I,2)
0077                            InBuf(I,2) = InBuf(I,1)
```

HALFTONE

```
0078
0079                            OutBuf(I,3) = OutBuf(I,2)
0080                            OutBuf(I,2) = OutBuf(I,1)
0081                    Enddo
0082
0083            Enddo
0084
0085            Return
0086            End 0001            Subroutine Put_Mono_Lns(LineNo,OutLin)
0002
0003            Implicit None
0004
0005            include 'olyp:pattern.inc'
0026            include 'ieiss_inc:ieiss_dt.inc'
0037            include 'ieiss_inc:ieiss_er.inc'
0064            include 'ieiss_inc:ieiss_nd.inc'
0102
0103
0104            Integer*4       LineNo,         !Line number to write
0105        x                   Status,         !Function return status
0106        x                   Pnum            !Current pixel number
0107
0108            Integer*2       OutLin(Npixs)   !Output line
0109
0110    C Output the standard image
0111            Status = Writli(StdOut,0,LineNo,LineNo,1,Npixs,0,Int2,OutLin)
0112            If (Status.NE.Ieiss_success) Call Fatal(Status)
0113
0114    C If necessary write the binary
0115            If (Pck_En) then
0116                    Status = Writli(PckOut,0,LineNo,LineNo,1,Npixs,0,Int2,OutLin)
0117                    If (Status.NE.Ieiss_success) Call Fatal(Status)
0118            Endif
0119
0120            Return
0121            End 0001            Integer*2 FUNCTION Get_Mono_Lvl(Lnum,Pnum,Inbuf,Outbuf,Prvln)
0002
0003            Implicit None
0004
0005            include 'olyp:pattern.inc'
0026
0027            Integer*4       Pnum,               !Current pixel number
0028        x                   Lnum,               !Current line number
0029        x                   Status,             !Function return status
0030        x                   I,J,                !Loop variable
0031        x                   Pptr,               !Temp. pixel pointer
0032        x                   DR,DC               !Pointers into the pattern array
0033
0034            Integer*2       InBuf(Npixs,5),     !Input buffer
0035        x                   OutBuf(Npixs,3),    !Current binary outbuf buffer
0036        x                   PrvLn(0:Npixs),     !Previous pixel values
0037        x                   Contone(-2:2,5),    !5x5 window of contone data
0038        x                   Binary(-2:2,5)      !5x5 window of binary data
0039
0040            Real*4          DiffA,DiffB,DiffC,  !Convolved differences
0041        x                   Convolve            !Funct. to compute the convolved differences
0042
0043
0044    C Build the window of continuous data
0045            Do I = -2,2
0046                    Pptr = Pnum + I
0047                    If (Pptr.LT.1) then
0048                            Pptr = 1
```

```
0049                    Elseif (Pptr.GT.Npixs) then
0050                            Pptr = Npixs
0051                    Endif
0052                    Do J = 1,5
0053                            Contone(I,J) = Inbuf(Pptr,J)
0054                    Enddo
0055            Enddo
0056
0057    C Build the constant part of the window of binary data
0058            Do I = -2,2
0059                    Pptr = Pnum + I
0060                    If (Pptr.LT.1) then
0061                            Pptr = 1
0062                    Elseif (Pptr.GT.Npixs) then
0063                            Pptr = Npixs
0064                    Endif
0065                    Do J = 1,3
0066                            Binary(I,J+2) = Outbuf(Pptr,J)
0067                    Enddo
0068            Enddo
0069
0070    C Build the rest of the binary window for the prev. line pixel value
0071            DR = Mod(Lnum,32) + 1
0072            Do I = 0,2
0073                    DC = Mod(Pnum+I,32) + 1
0074                    Binary(I,3) = Pattern(DR,DC,PrvLn(PNum)+1) * 255
0075            Enddo
0076            Do I = -2,2
0077                    Pptr = Pnum + I
0078                    If (Pptr.EQ.-1) Pptr = 31
0079                    DC = Mod(Pptr,32) + 1
0080
0081                    DR = Mod(Lnum+1,32) + 1
0082                    Binary(I,2) = Pattern(DR,DC,PrvLn(PNum)+1) * 255
0083
0084                    DR = Mod(Lnum+2,32) + 1
0085                    Binary(I,1) = Pattern(DR,DC,PrvLn(PNum)+1) * 255
0086            Enddo
0087
0088    C Calculate the difference between the filtered input and filtered binary "A"
0089            DiffA = Convolve(Contone,Binary)
0090
0091    C Build the rest of the binary window for the prev. pixel value
0092            DR = Mod(Lnum,32) + 1
0093            Do I = 0,2
0094                    DC = Mod(Pnum+I,32) + 1
0095                    Binary(I,3) = Pattern(DR,DC,PrvLn(PNum-1)+1) * 255
0096            Enddo
0097            Do I = -2,2
0098                    Pptr = Pnum + I
0099                    If (Pptr.EQ.-1) Pptr = 31
0100                    DC = Mod(Pptr,32) + 1
0101
0102                    DR = Mod(Lnum+1,32) + 1
0103                    Binary(I,2) = Pattern(DR,DC,PrvLn(PNum-1)+1) * 255
0104
0105                    DR = Mod(Lnum+2,32) + 1
0106                    Binary(I,1) = Pattern(DR,DC,PrvLn(PNum-1)+1) * 255
0107            Enddo
0108
0109    C Calculate the difference between the filtered input and filtered binary "B"
0110            DiffB = Convolve(Contone,Binary)
0111
0112    C Build the rest of the binary window for the current pixel value
0113            DR = Mod(Lnum,32) + 1
0114            Do I = 0,2
0115                    DC = Mod(Pnum+I,32) + 1
0116                    Binary(I,3) = Pattern(DR,DC,Inbuf(PNum,3)+1) * 255
0117            Enddo
0118            Do I = -2,2
0119                    Pptr = Pnum + I
0120                    If (Pptr.EQ.-1) Pptr = 31
0121                    DC = Mod(Pptr,32) + 1
0122
0123                    DR = Mod(Lnum+1,32) + 1
0124                    Binary(I,2) = Pattern(DR,DC,Inbuf(PNum,3)+1) * 255
0125
0126                    DR = Mod(Lnum+2,32) + 1
0127                    Binary(I,1) = Pattern(DR,DC,Inbuf(PNum,3)+1) * 255
0128            Enddo
0129
0130    C       Calculate the difference between the filtered input and filtered binary "C"
0131            DiffC = Convolve(Contone,Binary)
0132
0133    C Return the pixel value which has the lowest convolved difference
0134            If ((DiffA.LE.DiffB).and.(DiffA.LE.DiffC)) then
```

```
0135                 Get_Mono_Lvl = PrvLn(PNum)
0136            Elseif (DiffB.LE.DiffC) then
0137                 Get_Mono_Lvl = PrvLn(PNum-1)
0138            Else
0139                 Get_Mono_Lvl = Inbuf(PNum,3)
0140            Endif
0141
0142       End 0001       Real*4 FUNCTION Convolve(Contone,Binary)
0002
0003       Implicit None
0004
0005       Integer*2       Contone(5,5),         !Continuous tone data
0006     x                 Binary(5,5),          !Binary data
0007     x                 I,J                   !Loop Variables
0008
0009       Real*4          HVS(5,5)              !Human pt. spread funct.
0010
0011       Data HVS/-0.062500, 0.015625, 0.125000, 0.015625,-0.062500,
0012     x           0.015625, 0.250000, 0.500000, 0.250000, 0.015625,
0013     x           0.125000, 0.500000, 1.000000, 0.500000, 0.125000,
0014     x           0.015625, 0.250000, 0.500000, 0.250000, 0.015625,
0015     x          -0.062500, 0.015625, 0.125000, 0.015625,-0.062500/
0016
0017       Convolve = 0
0018
0019  C Compute the difference between the two arrays and convolve
0020       Do I = 1,5
0021         Do J = 1,5
0022           Convolve = Convolve + (HVS(I,J) * (Contone(I,J) - Binary(I,J)))
0023         Enddo
0024       Enddo
0025
0026  C Normalize the convolution result
0027       Convolve = ABS(Convolve / 9.0)
0028
0029       End 0001       Subroutine Get_Image_Lns(LineNo,InBuf)
0002
0003
0004       Implicit None
0005
0006       include 'olyp:pattern.inc'
0027       include 'ieiss_inc:ieiss_dt.inc'
0038       include 'ieiss_inc:ieiss_er.inc'
0065       include 'ieiss_inc:ieiss_nd.inc'
0103
0104       Integer*4       Status,               !Function return status
0105     x                 LineNo,               !Center line in image to read
0106     x                 ImLnum                !Current line in image
0107
0108       Integer*2 InBuf(Npixs)                !Multi-line buffer
0109
0110  C Handle underflow and overflow by replicating the first
0111  C line or last line as appropriate.
0112       If (LineNo.LT.1) then
0113           ImLnum = 1
0114       Elseif (LineNo.GT.Nlins) then
0115           ImLnum = Nlins
0116       Else
0117           ImLnum = LineNo
0118       Endif
0119
0120       Status = Readli(InImg,0,ImLnum,ImLnum,1,Npixs,0,Int2,InBuf)
0121       If (Status.NE.Ieiss_success) Call Fatal(Status)
0122
0123       Return
0124       End
```

What is claimed is:

1. A method of generating a halftone image with an electronic digital computer, comprising the steps of:
   a. providing a set of minimum visual noise L×M bit binery patterns by employing a stochastic combinatorial minimization technique and a human visual modulation transfer function (MTF) weighting function to generate a halftone bit pattern for each density level of the multi-level digital image signal, each pattern corresponding to a possible density level of a multiple level digital image signal;
   b. providing a digital image having pixel values representing density levels; and
   c. for each pixel value of the digital image signal, modularly selecting a portion of the binary bit pattern from the corresponding pattern of the set by addressing the bit pattern with lower significant bits of an x,y pixel address associated with each pixel, and employing the selected portion to form the halftone image.

2. The method claimed in claim 1, wherein the digital image signal is provided by a computer programmed to generate graphic images.

3. The method claimed in claim 1 wherein the bit patterns are the same resolution as the digital image, and the selected portion of the bit pattern is one bit.

4. The method claimed in claim 1, wherein the bit patterns are of higher resolution than the digital image, and the selected portion of the bit pattern is a block of bits.

5. A method of generating a halftone image with an electronic digital computer, comprising the steps of:
   a. providing a set of minimum visual noise L×M bit binary patterns, each pattern corresponding to a possible density level of a multiple level digital image signal;
   b. providing a digital image having pixel values representing density levels; and
   c. for a given pixel value of the digital image signal,
      (1) modularly selecting a future portion of an N×N neighborhood of binary values from the corresponding binary bit pattern by addressing the bit pattern with lower significant bits of an x,y pixel address associated with each pixel,
      (2) combining the future portion of selected binary values with a past portion of an N×N neighborhood of previously determined binary bits to form a combined neighborhood of binary bits,
      (3) applying a visual blur function to the combined neighborhood of binary bits to produce a perceived output value,
      (4) repeating steps (1) through (3) for a plurality of neighboring pixel values to produce a plurality of estimated perceived output values,
      (5) computing the difference between the respective estimated perceived output values and the given pixel value and neighboring pixel values to form error values and determining the minimum error value, and
      (6) generating the halftone image by placing the binary bit pattern from the minimum visual noise pattern corresponding to the pixel value associated with the minimum error value computed in step 5 at each corresponding pixel location.

6. The method claimed in claim 5, wherein the digital image signal is provided by scanning and digitizing a continuous tone image.

7. The method claimed in claim 5, wherein the future portion corresponds to the next two values in a row following the modular address (the lower significant bits of the pixel address) of the given pixel and five pixels in each of the next two rows centered on the modular address of the given pixel, and the past neighborhood corresponds to the two values in a row preceding the modular address of the given pixel, and five values in each of two preceding rows, centered on the modular address of the given pixel.

8. The method claimed in claim 5 wherein the step of providing a set of minimum visual noise binary bit patterns comprises employing a stochastic combinatorial minimization technique and a human visual system modulation transfer function (MTF) weighting function to generate a halftone bit pattern for each density level of the multi-level digital image signal.

9. The method claimed in claim 5, wherein N=5, and the blur function is:

$$-\frac{1}{16} \quad \frac{1}{64} \quad \frac{1}{8} \quad \frac{1}{64} \quad -\frac{1}{16}$$
$$\frac{1}{64} \quad \frac{1}{4} \quad \frac{1}{2} \quad \frac{1}{4} \quad \frac{1}{64}$$
$$\frac{1}{8} \quad \frac{1}{2} \quad 1 \quad \frac{1}{2} \quad \frac{1}{8}$$
$$\frac{1}{64} \quad \frac{1}{4} \quad \frac{1}{2} \quad \frac{1}{4} \quad \frac{1}{64}$$
$$-\frac{1}{16} \quad \frac{1}{64} \quad \frac{1}{8} \quad \frac{1}{64} \quad -\frac{1}{16}.$$

10. A method of generating a halftone image with an electronic digital computer, comprising the steps of:
   a. providing a set of minimum visual noise L×M bit binary patterns by employing a stochastic combinatorial minimization technique and a human visual system modulation transfer function (MTF) weighting function to generate a halftone bit pattern for each density level of the multi-level digital image signal, each pattern corresponding to a possible density level of a multiple level digital image signal;
   b. providing a digital image having pixel values representing density levels;
   c. for successive two-dimensional blocks of pixel values in the digital image,
      (1) calculating the mean value of the pixels in the block,
      (2) modularly selecting a portion of the binary bit pattern corresponding to the mean pixel value by addressing the binary bit pattern with lower significant bits of an x,y address corresponding to the location of the two-dimensional blocks of pixel values,
      (3) detecting a two-dimensional slope in the pixel values across the block,
      (4) performing a spatial transformation on the selected portion of the bit pattern to shift the spatial position of binary values in proportion to the detected slope, and
      (5) employing the transformed selected portion of the bit pattern to form the halftone image.

11. The method claimed in claim 1, 10 or 8, wherein the stochastic combinatorial miniminzation technique is stochastic annealing.

12. The method claimed in claim 11, wherein the stochastic annealing process comprises the steps of:
   a. initializing a random pattern of binary bits with p ones, where p is proportional to the density level for the pattern;
   b. calculating a cost function according to the equation $$cost = \sum_{i=1}^{n} \sum_{j=1}^{m} V_{ij} \sqrt{P_{ij}P_{ij}^*}$$

where i,j are x,y spatial frequency indices, representing an output pixel rate, $V_{ij}$ is a human visual MTF scaled to the output pixel rate, $P_{ij}$ is the discrete fourier transform (DFT) of the pattern, and * represents complex conjugation;

c. randomly switching a pair of "1's" and "0's" in the bit pattern to form a new pattern and calculating a new cost according to step b;
d. calculating a test statistic q to determine if the new cost is from a lower cost random process, given by $$q = \exp - \left( \frac{\Delta \cos t}{T} \right),$$

where $\Delta$cost=new cost−cost, and T is a normalization parameter set initially such that substantially 80% of new patterns will be determined to be from a lower cost random process even when $\Delta$cost is greater than 0;
e. replace the random pattern with the new pattern if $q>1$ or $q\leq 1$ and $\epsilon \leq q$, where $\epsilon$ is a uniform random number between 0 and 1, otherwise, reject the new pattern and retain the previous pattern;
f. repeat steps c. through e. about 1500 times;
g. decrease T to kT where k is about 0.95 and repeat steps c. through f.; and
h. repeat steps c. through g until the cost at successive decreases in T are no longer changing or until about 300 decreases in T have occurred.

13. The method claimed in claim 12, wherein the stochastic annealing process is performed on a super computer.

14. The method claimed in claim 1, 5, or 10, wherein the digital image is a color image having a plurality of color components, and the method is performed on each color component.

15. The method claimed in claim 1, 5, or 10, wherein the bit patterns are 32 by 32 bits.

16. The method claimed in claim 1, 5, or 10, wherein the step of modularly selecting comprises employing lower significant bits of an x,y pixel address to address a bit pattern memory.

17. The method claimed in claim 10, wherein said successive two-dimensional pixel blocks are 16×16 blocks, which overlap one pixel in the horizontal and vertical directions.

18. The method claimed in claim 10, wherein step c. further comprises the steps of:
a. detecting the presence of a sharp edge within the block, and
b. where an edge is detected, decomposing the block into a plurality of sub-blocks and processing each sub-block independently.

* * * * *